(12) United States Patent
Howard et al.

(10) Patent No.: US 11,021,329 B2
(45) Date of Patent: Jun. 1, 2021

(54) TENSIONING ASSEMBLY FOR A BELT CONVEYOR SYSTEM AND BELT CONVEYOR SYSTEM COMPRISING THE SAME

(71) Applicant: Mettler-Toledo Safeline Ltd., Manchester (GB)

(72) Inventors: Steve Howard, Manchester (GB); Michael Game, Warrington (GB); Raul Sanchez Barato, Manchester (GB)

(73) Assignee: METTLER-TOLEDO SAFELINE LTD., Manchester (GB)

( * ) Notice: Subject to any disclaimer, the term of this patent is extended or adjusted under 35 U.S.C. 154(b) by 0 days.

(21) Appl. No.: 16/850,322

(22) Filed: Apr. 16, 2020

(65) Prior Publication Data
US 2020/0331704 A1    Oct. 22, 2020

(30) Foreign Application Priority Data
Apr. 17, 2019  (EP) .................................... 19169768

(51) Int. Cl.
*B65G 23/44* (2006.01)
*B65G 21/06* (2006.01)

(52) U.S. Cl.
CPC ............ *B65G 23/44* (2013.01); *B65G 21/06* (2013.01)

(58) Field of Classification Search
CPC ................................. B65G 21/06; B65G 23/44
See application file for complete search history.

(56) References Cited

U.S. PATENT DOCUMENTS

| 2,344,498 | A |   | 3/1944  | Harvey       |           |
|-----------|---|---|---------|--------------|-----------|
| 3,436,979 | A | * | 4/1969  | Molitor      | B65G 23/44 |
|           |   |   |         |              | 474/138   |
| 3,921,793 | A | * | 11/1975 | Hutchinson   | B65G 23/44 |
|           |   |   |         |              | 198/813   |
| 3,993,185 | A | * | 11/1976 | Fleckenstein | B65G 21/06 |
|           |   |   |         |              | 198/813   |

(Continued)

FOREIGN PATENT DOCUMENTS

| DE | 102006014455 A1 | * | 10/2007 | ............ B65G 23/44 |
|----|-----------------|---|---------|-------|
| GB | 593810 A        |   | 10/1947 |       |

(Continued)

OTHER PUBLICATIONS

Search Report issued in corresponding European Patent Application No. EP19169768.9-1017, 12 pages (dated Oct. 14, 2019).

*Primary Examiner* — Gene O Crawford
*Assistant Examiner* — Keith R Campbell
(74) *Attorney, Agent, or Firm* — Buchanan Ingersoll & Rooney PC

(57) ABSTRACT

A tensioning assembly for a belt conveyor system includes a tension roller having a roller body and an axial shaft, a support frame for supporting the tension roller on first and second axial end portions of the shaft, and an abutment device articulated to the support frame and configured and adapted for movement between a first position in abutment against axial end portions of the shaft of the tension roller to locate the tension roller in an operative position relative to the support frame, and a second position in which the abutment means is withdrawn from axial end portions of the shaft of the tension roller such that the tension roller is movable to a release position.

13 Claims, 5 Drawing Sheets

(56) References Cited

U.S. PATENT DOCUMENTS

| | | | |
|---|---|---|---|
| 4,185,908 A | | 1/1980 | Mahler et al. |
| 4,803,804 A | * | 2/1989 | Bryant .................. B65G 23/44 198/813 |
| 5,947,263 A | | 9/1999 | Uber et al. |
| 5,984,083 A | * | 11/1999 | Hosch .................. B65G 23/44 198/810.04 |
| 6,161,683 A | * | 12/2000 | Wallis .................. B65G 21/105 198/813 |
| 6,752,261 B1 | | 6/2004 | Gaeddert et al. |
| 6,997,307 B2 | * | 2/2006 | Iseli ...................... B65G 23/44 198/813 |
| 8,469,182 B2 | * | 6/2013 | Alotto .................. B65G 23/44 198/813 |
| 8,931,629 B2 | | 1/2015 | Chellberg et al. |

FOREIGN PATENT DOCUMENTS

| | | |
|---|---|---|
| GB | 2041315 B | 6/1983 |
| JP | S5796113 U | 6/1982 |

* cited by examiner

TENSIONING ASSEMBLY FOR A BELT CONVEYOR SYSTEM AND BELT CONVEYOR SYSTEM COMPRISING THE SAME

RELATED APPLICATION

This application claims priority under 35 U.S.C. § 119 to European Patent Application No. 19169768.9 filed in Europe on Apr. 17, 2019, the entire content of which is hereby incorporated by reference in its entirety.

FIELD

The present disclosure relates to a tensioning assembly for a belt conveyor system, the assembly including a tension roller having a roller body and an axial shaft, the shaft having first and second axial end portions, the tension roller being configured and adapted to allow a conveyor belt of the belt conveyor system to pass around at least a portion of its circumference, a support frame for supporting the tension roller on the first and second axial end portions of the shaft, wherein the tension roller is movable relative to the support frame between an operative position for tensioning the conveyor belt and a release position for releasing the tension applied to the conveyor belt, and to a belt conveyor system including such a tensioning assembly.

BACKGROUND INFORMATION

Belt conveyor systems are used in various industries to move an object from one location to another one. The belt is passed around a drive roller that is configured and adapted to apply a driving force to the belt, thereby moving it in a conveying direction. One application example of such a belt conveyor system is a metal detector handling solution that is used to transport a product to be inspected through a metal detector aperture. The belt used in such a system can be fabric backed or solid manufactured from food approved polyurethane.

During assembly, the belt of the belt conveyor system is tensioned to ensure that sufficient contact is achieved between the belt and the drive roller. However, it should be ensured that the belt is not over-tensioned, which could lead to premature failure of the belt due to a distortion of the belt edges. Over-tensioning could also lead to premature failure of rollers and bearings and could potentially place excessive stress on the motor gear unit leading to an increased power usage and overheating. Overheating of the motor gear unit could lead to a heat hazard and a risk to the operator and could reduce the lifetime of the unit.

Furthermore, when applying a tension to the belt, this should be done equally across the width of the belt to ensure that the lateral alignment, which is also called "tracking" of the belt, is not affected. If the belt tracking is affected, the belt could move to one side of the conveyor. In the case of a metal detector conveyor, this would not only damage the edge of the belt but also the inside of the metal detector aperture.

In addition, the belts mentioned above require periodical tensioning since the belts stretch during use.

In order to address the issues noted issues, known belt conveyor systems can be provided with a tensioning assembly as already described.

In one example of such a belt tensioning assembly, the tension roller is moved relative to the support frame between an operative and a release position by using a vernier adjustor, as disclosed e.g. in U.S. Pat. No. 8,931,629 B2 and U.S. Pat. No. 4,185,908, the disclosures of which are incorporated herein by reference in their entireties. However, these systems only allow for a discrete change of the tension applicable to the belt in accordance with the arrangement of the holes on the vernier plate.

An alternative example is provided by a rack and pinion assembly disclosed e.g. in U.S. Pat. No. 6,752,261 B1, the disclosure of which is incorporated herein by reference in its entirety. Such an assembly allows for continuously adjusting tension applied to the belt. However, it is difficult to apply the identical tension on both sides of the belt, thereby complicating the tracking of the belt.

Still another tensioning assembly is disclosed in U.S. Pat. No. 5,947,263, the disclosure of which is incorporated herein by reference in its entirety. This assembly includes a slide member with a cylindrical pin which is supported within a cylindrical guide opening. By movement of the cylindrical pin, the tension to be applied to the belt can be changed. This setup also allows for a continuous adjustment of the tension. However, the assembly includes many pieces and is thus cumbersome in manufacturing and during its assembly.

While the assemblies mentioned allow for a tensioning of the belt, it is difficult to apply an identical tension on both sides of the belt, thereby complicating the tracking.

SUMMARY

A tensioning assembly is disclosed for a belt conveyor system, the assembly comprising: a tension roller having a roller body and an axial shaft, the shaft including first and second axial end portions, the tension roller being configured and adapted to allow a conveyor belt of the belt conveyor system to pass around at least a portion of its circumference; a support frame for supporting the tension roller on the first and second axial end portions of the shaft, wherein the tension roller is movable relative to the support frame between an operative position for tensioning the conveyor belt and a release position for releasing the tension applied to the conveyor belt; and abutment means articulated to the support frame and configured and adapted for movement between a first position (P1) in which an abutment portion of the abutment means is in abutment against the first and second axial end portions of the shaft of the tension roller to locate the tension roller in the operative position relative to said support frame, and a second position (P2) in which said abutment means is withdrawn from said first and second axial end portions of the shaft of the tension roller such that the tension roller is movable to the release position.

BRIEF DESCRIPTION OF THE DRAWINGS

In the following description, features of the invention will be described with reference to exemplary embodiments specified in greater detail by way of example with reference to the drawings, wherein.

DETAILED DESCRIPTION

Figure 1:
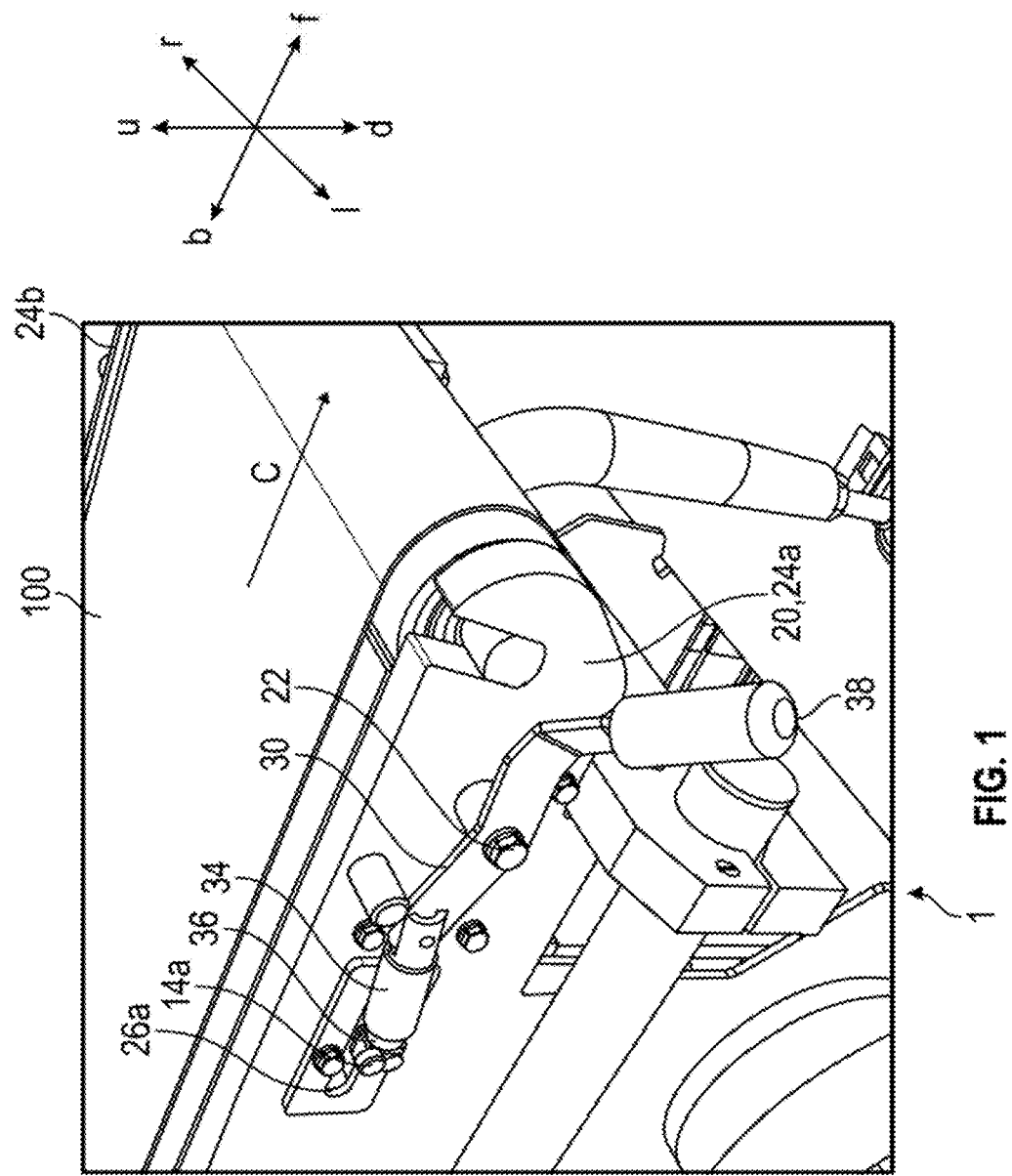
FIG. 1 is a partial perspective view of an exemplary belt conveyor system including an exemplary tensioning assembly according to the present disclosure.

According to the present disclosure, a tensioning assembly is disclosed having a simple setup which can enable a fine adjustment of tension to be applied to a belt. A belt conveyor system as also disclosed can include such a tensioning assembly. An exemplary assembly as disclosed can include an abutment means configured and adapted to be articulated for movement between a first position in which an abutment portion of the abutment means is in abutment against first and second axial end portions of the shaft of a tension roller to locate the tension roller in an operative position relative to a support frame, and a second position in which the abutment means is withdrawn from first and second axial end portions of the shaft of the tension roller such that the tension roller is movable to a release position.

The tensioning assembly according to the present disclosure can have a simple setup which allows for a simple handling thereby facilitating the tensioning of the belt.

In an exemplary belt conveyor system, the belt can be wound around two end rollers located at the respective upstream and downstream end portions of the belt conveyor system in the conveying direction. The end rollers can be attached to the support frame. In order to tension the belt, a tension roller can be used. The tension roller includes a roller body and a shaft. The roller body can have a cylindrical shape. The tension roller can be arranged somewhere in between the end rollers and supported by the support frame. The belt is wound around at least a portion of the circumference of the tension roller. The tension roller is movable with respect to the support frame thereby applying a tension to the belt or releasing a tension applied to the belt. The tension roller can be used alone to apply tension to the belt, or it can cooperate with one or several other rollers.

The tensioning assembly can include an abutment means configured to be articulated to a support frame. The abutment means can for example pivot with respect to the support frame. Then, the pivoting motion of the abutment means is transformed to a movement of the abutment means between a first position in which the abutment portion of the abutment means is in abutment against the axial end portions of the shaft of the tension roller to locate the tension roller in an operative position relative to the support frame, and a second position in which the abutment means is withdrawn from the axial end portions of the shaft of the tension roller such that the tension roller is movable to a release position. Thus, the operation of the abutment means allows for an easy switch between the first and the second position of the abutment means, i.e., between an operative position (tensioning position) and a release position. This can be very useful when rollers are to be cleaned or removed since the tension applied to the belt can be released by a simple movement of the abutment means.

In an exemplary embodiment of the present disclosure, the abutment means can be articulated to the support frame via a pivot, and a length of a lever arm of the abutment means extending between the pivot and the abutment portion can be adjustable. This setup allows for an adjustment of the operative position relative to the support frame and thereby to adjust the tension to be applied to the belt.

In an exemplary embodiment of the present disclosure, the lever arm can include a bushing having an internal thread and a plunger received in the bushing and having an external thread matching the internal thread such that a rotation of the bushing and the plunger with respect to each other results in their linear displacement with respect to each other. Such a telescopic setup allows for a very simple adjustment of the length of the lever by a simple rotation of the bushing and the plunger with respect to each other. The abutment portion can be connectable to the plunger or can be located on the plunger, and thereby the operative position of the abutment means can be adjusted.

In still another exemplary embodiment of the present disclosure the support frame can include first and second side walls laterally opposed to each other, and the abutment means can include a first abutment means articulated to the first side wall and a second abutment means articulated to the second side wall. In such a setup, one abutment means is provided for each of the first and second axial end portions of the shaft. When this setup is combined with a lever arm with adjustable length as described, the tracking of the belt is simplified. Namely, the abutment means is first moved to the second position. There, the length of the lever arm of the first abutment means and the second abutment means is adjusted to be identical. Then, both abutment means are moved to the first position. This allows application of an identical tension to both sides of the belt of a belt conveyor system. If the first and second abutment means are moved back to the release position, it is easy to apply the same tension as before to the belt since the length of the lever arm is fixed. That is, by moving the first and second abutment means back to the first position, the same tension as before can be applied to the belt.

In an exemplary embodiment of the present disclosure, the abutment means can include locking means for locking the length of the lever arm. Such an exemplary embodiment simplifies the reproducible application of the same tension to the conveyor belt.

In an exemplary embodiment of the present disclosure, the first and second side walls can each include a slot extending in a direction of a connecting line between the first position and the second position, and the axial end portions of the shaft of the tension roller can be movable with respect to the support frame within the slots. This is a particularly simple setup that allows for a movement of the tension roller with respect to the support frame.

In another exemplary embodiment, the roller body can be rotatable with respect to the shaft. This can be particularly useful in the case that the axial end portions of the tension roller are movable within the slots provided in the side walls of the support frame. Then, the shaft can be rotatably fixed with respect to the slots. In this way, the shaft is supported by the support frame in a very reliable way.

In yet another exemplary embodiment of the present disclosure, the abutment means can be provided with a graduated display that allows to read off the length of the lever arm. The graduated display is similar to the one of a micrometer or a vernier and thereby allows for a particularly fine adjustment of the length of the lever arm. Furthermore, this setup is particularly useful when first and second abutment means are articulated to two side walls of the support frame, since it may not be possible to see or reach the first and second abutment means at the same time due to the width of the belt conveyor system. In this case, the graduated display facilitates to apply equal tension to both sides of the belt, thereby facilitating the tracking.

According to another exemplary embodiment of the present disclosure, the bushing can include evenly spaced and circumferentially arranged recesses for receiving O-rings to read off the length of the lever arm. In this exemplary embodiment, the bushing is circumferentially covered by a cylindrical sheath having one axial end thereof connected to the plunger. The opposite free axial end is of annular shape. Depending on the relative axial position of the plunger with respect to the bushing, the number of O-rings covered by the sheath changes. Thus, the number of O-rings visible from the outside on the circumference of the bushing beyond the annular axial end changes in accordance with the length of the lever arm. This allows to read off the length of the lever arm in a very easy way. The O-rings can be provided in different colors to further facilitate the determination of the length of the lever arm.

In an exemplary embodiment of the present disclosure, the abutment means can include a handle for moving the abutment means between its first position and its second position. The handle can extend from the pivot articulating the abutment means to the support frame in a direction opposite to the extension direction of the lever arm which extends between the pivot and the abutment portion. In an exemplary embodiment of the present disclosure, the handle can be pivotable in the up-down direction resulting in a movement of the lever arm between the first and the second position.

According to another aspect of the present disclosure, there is provided a belt conveyor system including a tensioning assembly as described above and a conveyor belt, wherein the conveyor belt is passed around at least a portion of the circumference of the tension roller.

The tensioning assembly of the present disclosure has a simple setup and allows for an easy operation. Furthermore, when one abutment means is provided on each side of the two axial end portions of the shaft, the tracking of a belt of a belt conveyor system is simplified.

A synergistic effect can be achieved when the tensioning assembly described herein is used in combination with a conveyor roller assembly for a belt conveyor system, the conveyor roller assembly including: a conveyor roller having a cylindrical roller body and an axial shaft, the shaft having a first axial end portion and a second axial end portion, a support structure for supporting the shaft of the conveyor roller, the support structure having two side members laterally opposed to each other, each side member including a recess, the recesses being laterally opposed to each other, each recess being recessed from an upper edge portion of the respective side member in an up-down direction such that each recess includes a free end portion in the vicinity of the upper edge portion of the support structure to allow insertion of one of the axial end portions of the shaft from above, and a closed end portion for supporting the inserted axial end portions of the shaft and a connecting portion connecting the free end portion and the closed end portion wherein for each recess the free end portion is longitudinally offset from the closed end portion in a direction opposite to an operational force which biases the respective axial end portion of the shaft against an edge portion of the recess.

Due to the longitudinal offset of the free end portion from the closed end portion in a direction opposite to the operational force which biases the respective axial end portion of the shaft of the conveyor roller against the edge portion of the recess, the conveyor roller is prevented from being lifted out of the recesses during operation. This technical effect can be understood as follows: during operation, the axial end portions of the conveyor roller are supported by the closed end portions of the recess. To remove the conveyor roller, the axial end portions are moved towards the free end portions. These are, however, longitudinally offset in the direction opposite to the operational force. That is, a counterforce in the direction opposite to the operational force is applied to move the axial end portions located at the closed end portions towards the free end portions.

The shaft of the conveyor roller is supported by the support structure. The support structure can be attachable to the conveyor system. Alternatively, the support structure can be an integral part of the conveyor system. The support structure includes two side members which are laterally opposed to each other in a direction intersecting with a conveying direction of the conveyor system. The side members support the conveyor roller at both of its axial end portions. Each side member includes an upper edge portion which is located in the vicinity of the goods conveyed by the conveyor system during use.

A recess can be provided in each of the side members. Each recess is recessed from the upper edge portion of the respective side member such that the first and second axial end portions of the shaft of the conveyor roller are insertable in the respective recess in an up-down direction. That is, each recess has a free end portion providing an entrance aperture for the respective axial end portion of the shaft. Furthermore, each recess has a closed end portion. When the shaft is inserted into the recess, the axial end portions of the shaft abut against the edge of the respective closed end portion and are thus supported by the closed end portions. Furthermore, each recess is provided with the connecting portion which connects the free end portion and the closed end portion. That is, when the axial end portion of the shaft is inserted into the recess, the shaft passes from the free end portion through the connecting portion to the closed end portion.

During use of the conveyor roller assembly the operational force is applied to the axial end portions of the shaft of the conveyor roller. In the belt conveyor system, a drive force is applied to the belt which is transmitted to the axial end portions of the shaft of the conveyor roller. The belt is fed around the conveyor roller. In general, the belt is under tension during use. This results in a force that is applied to the axial end portions of the shaft, and as a result a torque is applied to the conveyor roller. If the recesses were formed such that the connecting line between the free end portion and the closed end portion was perpendicular to the applied force, i.e., if the free end portion was not longitudinally offset from the closed end portion in the direction opposite to the operational force, there would be a risk that the conveyor roller is lifted out of the recesses due to the applied torque. Thus, according to the disclosure, the free end portion of the recess is longitudinally offset from the closed end portion in the direction opposite to the operational force. This arrangement prevents the conveyor roller being lifted out from the recess. In the belt conveyor system, a tensional force is applied to the axial end portion of the shaft as already explained. Since the free end portion is longitudinally offset from the closed end portion where the axial end portion of the shaft is located, the conveyor roller must be moved against this tensional force to lift the conveyor roller out of the recesses. This prevents the axial end portions of the shaft to be lifted out of the recesses.

The two recesses can have the same shape or can have different shapes suitably configured.

According to another example, the roller body can be rotatable with respect to the shaft. In this case, the axial end portions of the shaft can be configured and adapted to allow a rotationally fixed arrangement of the shaft with respect to the support structure within the recess. That is, during use the shaft does not rotate with respect to the support structure, but only the roller body rotates around the shaft and thereby rotates with respect to the support structure. This allows for a particularly stable support of the axial end portions of the conveyor roller.

In an example, the axial end portions of the shaft and the closed end portions of the recesses can be formed complementary to one another to enable a rotationally fixed engagement of the axial end portions of the shaft and the recesses. For example, the axial end portions of the shaft can be formed such that a portion of their contours engages with an edge portion of the respective closed end portion when the shaft is inserted in the recesses. This enables a stable support of the conveyor roller in a very simple way.

In a further example, an edge portion of the connecting portion of the recess can extend in a straight line that is inclined from the up-down direction between the free end portion and the closed end portion. In such a setup the angle of inclination a of the straight line with respect to the up-down direction can for example be $\alpha \geq 5°$, or for example preferably $\alpha \geq 10°$, and more preferably $\alpha \geq 15°$. Such a form of the recess allows for an easy insertion and removal of the axial end portion of the shaft.

In an alternative example, the edge portion of the connecting portion of the recess includes a curved portion that is curved in the direction of the operational force. Such a curvature allows to maintain the positioning of the axial end portion of the shaft at the closed end portion even if a very strong operational force is applied to the shaft.

In an example, the conveyor roller can be an infeed or an outfeed roller. An infeed or an outfeed roller is located at one of the end portions of the conveyor system in the conveying direction. The belt is wound around the infeed or outfeed roller. Since the operational force applied to the infeed or outfeed roller by the belt is directed towards the end portion opposite to the end portion at which the infeed or outfeed roller is located, i.e. towards the middle of the conveyor system, the closed end portion is longitudinally offset from the free end portion towards the middle of the conveyor system. This has another advantage: namely, if the conveyor roller assembly is used in a conveyor system that is placed between a preceding and a following conveyor system, the form of the recess according to the present disclosure moves the conveyor roller supported at the closed end portion towards the middle of the conveyor, i. e. away from the preceding or following conveyor, thereby allowing its insertion in and its removal from the recesses without causing interference with the preceding or following conveyor system.

The combination of the tensioning assembly and the conveyor roller allows for a particularly quick and simple release of the conveyor roller around which a belt is fed. For example, it can be cumbersome to remove such a conveyor roller from the belt conveyor assembly. If, however, the tension belt assembly according to the present disclosure is used in combination with the conveyor roller assembly described, a quick and easy release of the conveyor roller can be achieved as follows: first, the tensioning assembly is used to release the tension applied to the belt by moving the tension roller to its release position. Then, the conveyor roller can be removed from the support structure by lifting it in the up-direction. This removal is easy since the operational force applied to the conveyor roller due to the tensioning of the belt is no longer present. However, the conveyor roller assembly can also be used without the conveyor roller assembly and provides the advantageous effects already described.

FIG. 1 shows a tensioning assembly 1 according to the present disclosure. The directions up (u), down (d), left (l), right (r), front (f) and back (b) are defined in the coordinate system shown in FIG. 1.

The tensioning assembly 1 is used in a belt conveyor system including a belt 100. The belt 100 is movable in the conveying direction C. In FIG. 1, only a first axial end portion 14a of a shaft 14 of a tension roller 10 is shown. The shaft 14 is supported in a slot 26a of a first side wall 24a of a support frame 20. The slot 26a extends in the conveying direction C. As will be explained in more detail, the first axial end portion 14a is movable in the slot 26a.

FIG. 1 also shows abutment means 30. Abutment means 30 includes an abutment portion 31 (see FIG. 2) which is in abutment with the first axial end portion 14a of the shaft 14 in FIG. 1. The abutment means 30 is articulated to the first side wall 24a via a pivot 22. The abutment means 30 includes an articulated lever arm 32 extending from the pivot 22 in the direction of the tension roller 10 and includes the abutment portion 31. The abutment means 30 further includes a handle 38. The handle 38 is pivotable in the up-down (ud) direction. This results in a component of movement of the free end portion of the lever arm 32 in the front-back (fb) direction, thereby moving the axial end portion 14a of the shaft 14 within the slot 26a.

Figure 2:
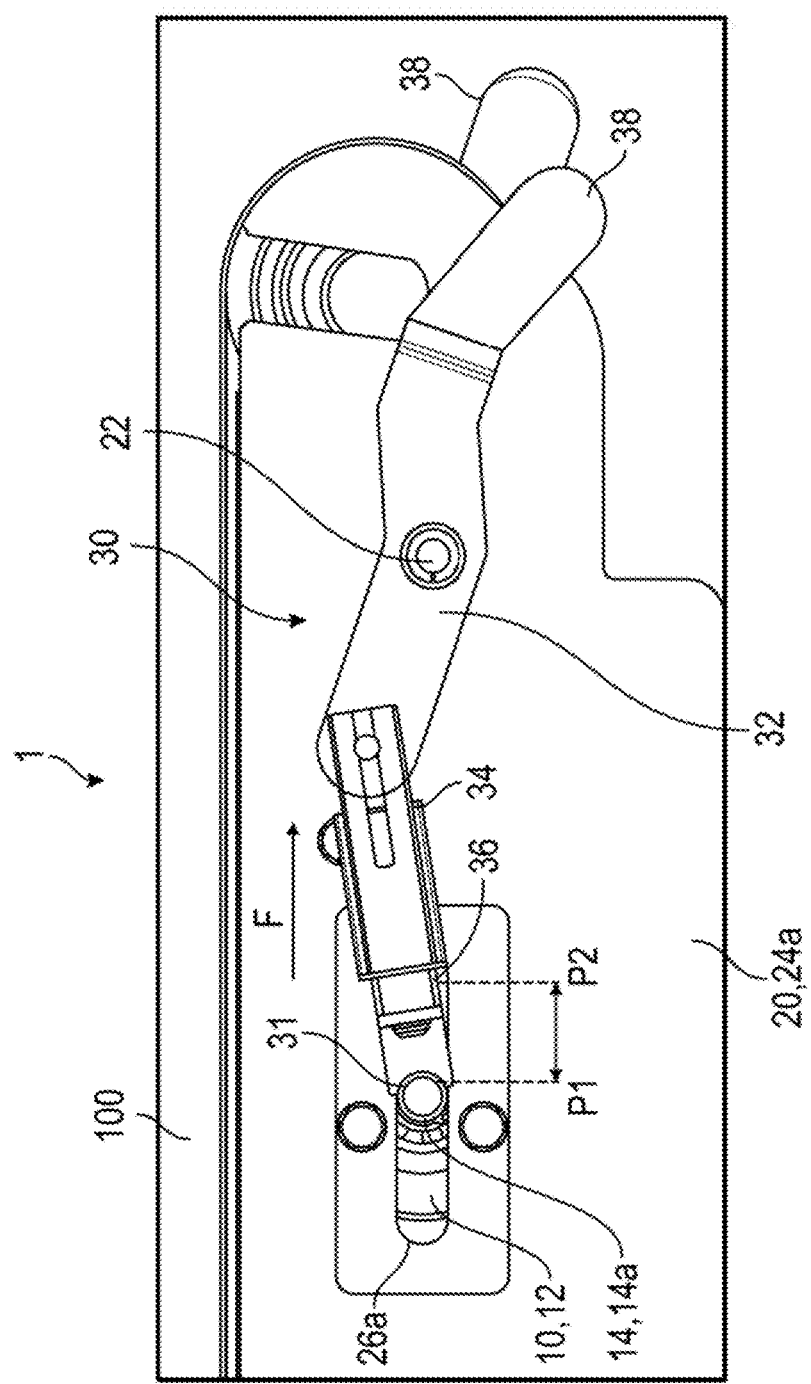
FIG. 2 is a partial left side view of the tensioning assembly shown in FIG. 1.

The function of the abutment means 30 can be understood more easily with reference to FIG. 2. FIG. 2 is a left side view of the belt conveyor system including the tensioning assembly 1 according to the present disclosure shown in FIG. 1. FIG. 2 also shows the belt 100, the support frame 20, the pivot 22, the first side wall 24a, the slot 26a and the abutment means 30. Furthermore, FIG. 2 shows the tension roller 10 including the roller body 12 and the shaft 14. The abutment portion 31 of the abutment means 30 is in its first position P1 in which the abutment portion 31 is in abutment with the first axial end portion 14a of the shaft 14. The lever arm 32 includes a bushing 34 and a plunger 36. The bushing 34 includes an internal thread (not shown in FIG. 2), and the plunger includes a matching external thread (not shown in FIG. 2). Thereby, the bushing 34 and the plunger 36 are rotatable with respect to each other in a screwing motion, which results in a change of the length of the lever arm 32.

In FIG. 2, the abutment portion 31 abuts against the first axial end portion 14a of the shaft 14 thereby maintaining the tension roller 10 in its operative position relative to the support frame 20. In the operative position, a tension that is proportional to the length of the lever arm 32 is applied to the belt 100. The belt 100 applies a force F in the direction of the pivot 22 to the tension roller 10. This force tends to rotate lever arm 32 in the clockwise direction, while lever arm 32 is prevented from rotation by a stop member (not shown). The abutment means 30 is thereby configured and adapted to apply a counterforce to the force F when it is in the position depicted in FIG. 2. Thereby the tensioning of the belt 100 is maintained.

When the handle 38 is moved in the up(u)-direction (see FIG. 1), the abutment portion 31 moves from the first position P1 to a second position P2 indicated in FIG. 2. Then, the tension roller 10 can be moved in the direction of the second position P2. This releases the tension applied to the belt 100.

Figure 3:
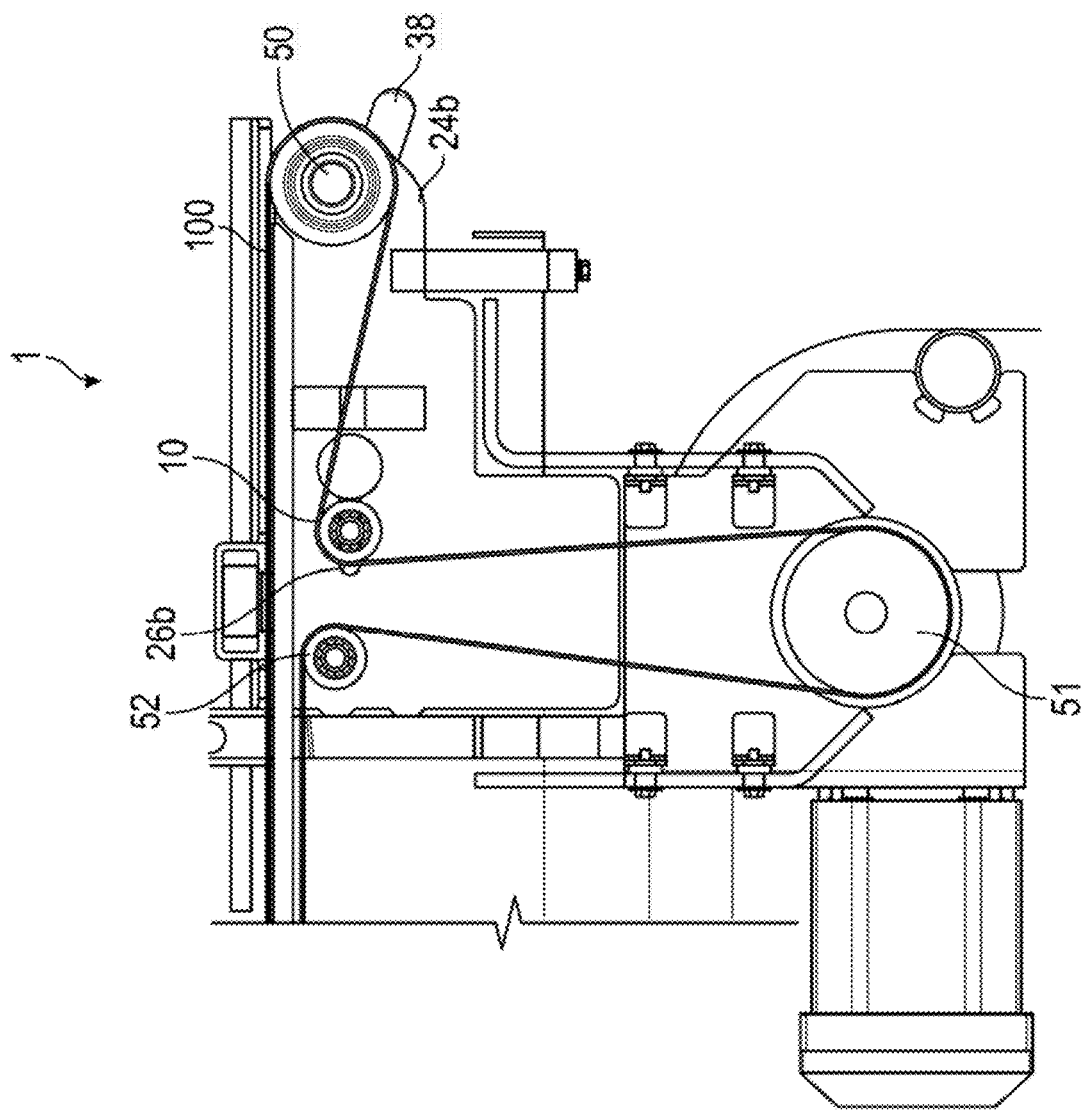
FIG. 3 is a partial left side view of a right side wall of the tensioning assembly shown in FIG. 1 and FIG. 2.

The application and the release of the tension to the belt 100 can be understood with reference to FIG. 3. FIG. 3 is a partial left side view of a right side wall 26b of the tensioning assembly 1 shown in FIGS. 1 and 2. That is, FIG. 3 shows a part of the belt conveyor assembly and the tensioning assembly 1 that is not visible from the outside of the belt conveyor system but is only visible once the belt 100 is removed. FIG. 3 shows the right side wall 24b including a slot 26b. A second axial end portion (not shown) of the tension roller 10 is movable within the slot 26b. The belt 100 is passed around an end roller 50, the tension roller 10, a first roller 51 and a second roller 52. It is obvious from FIG. 3 that a movement of the tension roller 10 to the left (i. e. towards the first position P1 in FIG. 2) results in a tensioning of the belt 100, wherein a movement of the tension roller 10 towards the right (i. e. towards the second position P2 in FIG. 2) results in a release of the tension applied to the belt 100.

Figure 4:
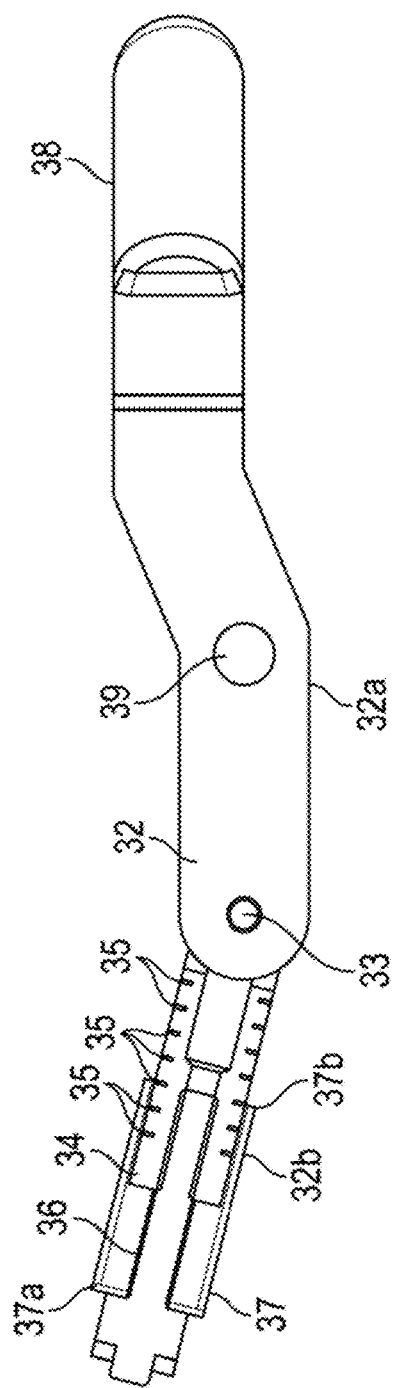
FIG. 4 is a partial sectional view of the abutment means of the tensioning assembly shown in FIG. 1 and FIG. 2.

FIG. 4 is a partial sectional view of the abutment means 30 of the tensioning assembly 1 shown in FIG. 1 and FIG. 2. The abutment means 30 is pivotally connected to one of the side walls 24a, 24b via a journal bearing 39. The abutment means 30 includes an arm having the handle 38 on the free end thereof and extending from the bearing 39 towards the right in FIG. 4 and it includes the lever arm 32 extending from the bearing 39 towards the left in FIG. 4. The lever arm 32 includes a first portion 32a and a second portion 32b. The first portion 32a extends between the bearing 39 and a joint 33 that pivotally connects the first portion 32a and the second portion 32b. The second portion 32b extends from the joint 33 in the opposite direction of the first portion 32a. The second portion 32b includes the bushing 34 and the plunger 36. The bushing 34 includes an internal thread that matches an external thread of the plunger 36. The bushing 34 and the plunger 36 are rotatable with respect to each other, and their rotation leads to a linear movement of the plunger 36 with respect to the bushing 34, thereby changing the length of the second portion 32b of the lever arm 32. The abutment portion 31 is rotatably connected to the free end of the plunger 36, as shown in FIG. 2. Thus, a rotation of the bushing 34 and the plunger 36 relative to each other leads to a linear movement of the abutment portion 31.

In the exemplary embodiment shown in FIG. 4, the bushing 34 includes several evenly spaced recesses 35 that are recessed along the circumference of the bushing 34. O-rings (not shown) are insertable into the recesses 35. The bushing 34 is circumferentially covered by a cylindrical sheath 37 having one axial end 37a connected to the plunger 36. The opposite free axial end 37b is of annular shape. Depending on the relative axial position of the plunger 36 with respect to the bushing 34, the number of O-rings covered by the sheath 37 changes. Thus, the number of O-rings visible from outside on the circumference of the bushing 34 beyond the annular axial end 37b changes in accordance with the length of the lever arm 32. This allows to read off the length of the lever arm 32 in a very easy way. It is also possible to provide O-rings with different colors to further simplify reading off the length of the lever arm 32.

Figure 4A:
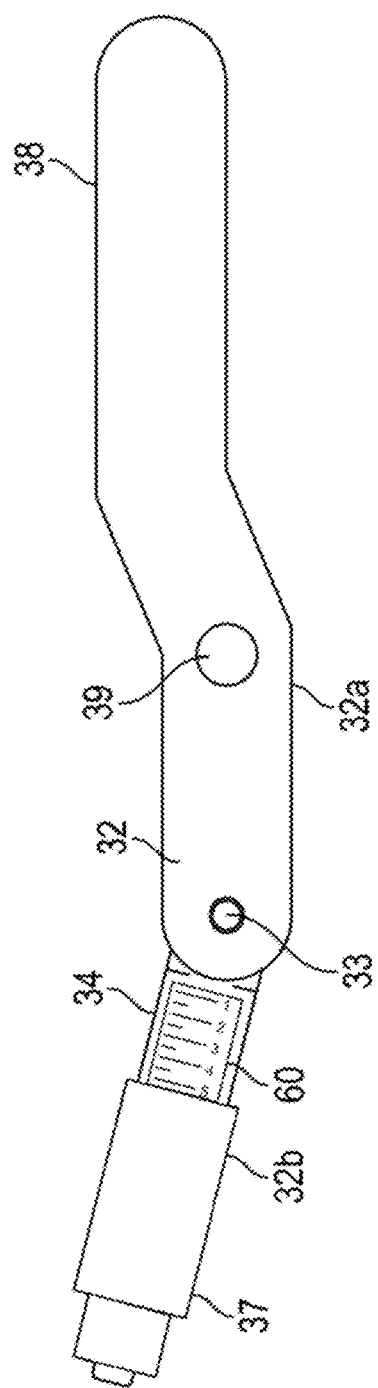
FIG. 4a is a view of another exemplary embodiment of an abutment means in which the graduated display is similar to that of a micrometer or a vernier.

FIG. 4a is a view of another exemplary embodiment of the abutment means in which the graduated display 60 is similar to that of a micrometer or a vernier. A graduated display 60 is arranged on the bushing 34 similar to one of a micrometer or a vernier, here a micrometer graduation is shown. The relative axial position of the plunger 36 with respect to the bushing 34, is indicated by the graduated display 60. This allows to read off the length of the lever arm 32 on the graduated display 60 in a very easy and reliable way and thereby allows for a particularly fine adjustment of the length of the lever arm. Furthermore, this setup is particularly useful when first and second abutment means are articulated to two side walls of the support frame, since it is typically not possible to see or reach the first and second abutment means at the same time due to the width of the belt conveyor system. In this case, the graduated display facilitates to apply equal tension to both sides of the belt, thereby facilitating the tracking.

It will be appreciated by those skilled in the art that the present disclosure can be embodied in other specific forms without departing from the spirit or essential characteristics thereof. The presently disclosed exemplary embodiments are therefore considered in all respects to be illustrative and not restricted. The scope of the disclosure is indicated by the appended claims rather than the foregoing description and all changes that come within the meaning and range and equivalence thereof are intended to be embraced therein.

LIST OF REFERENCE NUMERALS 1 tensioning assembly
10 tension roller
12 roller body
14 shaft
14a first axial end portion
20 support frame
22 pivot
24a first side wall
24b second side wall
26a slot
26b slot
30 abutment means
31 abutment portion
32 lever arm
32a first portion
32b second portion
33 joint
34 bushing
35 recess
36 plunger
37 sheath
37a axial end
37b free axial end
38 handle
39 journal bearing
50 end roller
51 first roller
52 second roller
60 graduated display
100 conveyor belt
F force
P1 first position
P2 second position

The invention claimed is:

1. A tensioning assembly for a belt conveyor system, the assembly comprising:
   a tension roller having a roller body and an axial shaft, the shaft including first and second axial end portions, the tension roller being configured and adapted to allow a conveyor belt of the belt conveyor system to pass around at least a portion of a circumference of the tension roller;
   a support frame for supporting the tension roller on the first and second axial end portions of the shaft, wherein the tension roller is movable relative to the support frame between an operative position for tensioning the conveyor belt and a release position for releasing the tension applied to the conveyor belt; and
   abutment means articulated to the support frame and configured and adapted for movement between a first position (P1) in which an abutment portion of the abutment means is in abutment against the first and second axial end portions of the shaft of the tension roller to locate the tension roller in the operative position relative to said support frame, and a second position (P2) in which said abutment means is withdrawn from said first and second axial end portions of the shaft of the tension roller such that the tension roller is movable to the release position;
a pivot, wherein the abutment means is articulated to said support frame via the pivot;
a lever arm of said abutment means, wherein a length (L) of the lever arm extending between said pivot and said abutment portion is adjustable;
a bushing having an internal thread;
a plunger received in said bushing and having an external thread matching the internal thread such that a rotation of the bushing and the plunger with respect to each other will result in their linear displacement with respect to each other;
wherein the abutment means comprises a graduated display configured to display a length of the lever arm; and
wherein the bushing comprises evenly spaced and circumferentially arranged recesses for receiving O-rings to read a length of the lever arm.

2. The tensioning assembly according to claim 1, wherein the support frame comprises:
first and second side Wallis laterally opposed to each other, the abutment means including a first abutment means articulated to said first side wall and a second abutment means articulated to said second side wall.

3. The tensioning assembly according to claim 2, wherein the abutment means comprises:
locking means for locking the length of the lever arm.

4. The tensioning assembly according to claim 3, wherein said first and said second side Wallis each comprise:
a slot extending in a direction of a connecting line between the first position (P1) and the second position (P2), and said axial end portions of the shaft of the tension roller are configured to be movable with respect to the support frame within the slots.

5. The tensioning assembly according to claim 4, wherein the roller body is rotatable with respect to the shaft.

6. The tensioning assembly according to claim 1, wherein said abutment means comprises:
a handle configured for moving said abutment means between the first position (P1) and the second position (P2).

7. A belt conveyor system comprising, in combination:
a tensioning assembly according to claim 1: and
a conveyor belt wherein the conveyor belt is passed around at least a portion of the circumference of the tension roller.

8. The tensioning assembly according to claim 1, wherein the roller body is rotatable with respect to the shaft.

9. A tensioning assembly for a belt conveyor system, the assembly comprising:
a tension roller having a roller body and an axial shaft, the axial shaft including first and second axial end portions, the tension roller being configured and adapted so that the first and second axial end portions slidingly engage with first and second slots, respectively, formed within a support frame, each of the first and second slots having a longitudinal axis; and
abutment means having a lever arm in mechanical connection with an abutment portion, the abutment means configured and adapted to be selectively transitioned to and from a first position (P1) and a second position (P2) via actuation of the lever arm;
the lever arm including a bushing and plunger assembly that are telescopically engaged with each other such that rotation of the plunger relative to the bushing causes linear movement of the plunger to adjust a length of the lever arm;
wherein:
movement of the abutment means to P1 causes the abutment portion to advance the first and second axial end portions along a first direction of the longitudinal axis of the first and second slots; and
movement of the abutment means to P2 retreats the abutment portion from the first and second axial end portions to allow the first and second axial end portions to move along a second direction of the longitudinal axis of the first and second slots, the first direction being opposite the second direction.

10. The tensioning assembly according to claim 9, comprising:
the support frame, wherein the abutment means is pivotally attached to the support frame.

11. The tensioning assembly according to claim 10, comprising:
an end roller; and
a conveyor belt configured to pass around the tension roller and the end roller;
wherein movement of the abutment means to P1 creates tension on the conveyor belt.

12. A tensioning assembly for a belt conveyor system, the assembly comprising:
abutment means having a lever arm in mechanical connection with an abutment portion, the abutment means configured and adapted to be selectively transitioned to and from a first position (P1) and a second position (P2) via actuation of the lever arm;
the lever arm including a bushing and plunger assembly that are telescopically engaged with each other such that rotation of the plunger relative to the bushing causes linear movement of the plunger to adjust a length of the lever arm;
wherein:
the abutment portion has a first distal end in mechanical connection with the lever arm;
the abutment portion has a second distal end configured and adapted to abut an axial end portion of a tension roller when the abutment means is transitioned to P1;
the abutment means is configured and adapted to be in mechanical connection with a support frame so that when transitioned to P1, the second distal end transfers force to the axial end portion of the tension roller.

13. The tensioning assembly according to claim 12, comprising:
the support frame;
the tension roller;
an end roller; and
a conveyor belt configured to pass around the tension roller and the end roller;
wherein movement of the abutment means to P1 creates tension on the conveyor belt.

* * * * *